United States Patent
Vos et al.

[11] Patent Number: 5,084,218
[45] Date of Patent: Jan. 28, 1992

[54] SPHERONIZING PROCESS

[75] Inventors: Thomas H. Vos, Rochester; James M. Kumkoski, Utica; Leo S. Knowlden, Romeo; George W. Goetz, Rochester Hills, all of Mich.

[73] Assignee: TRW Vehicle Safety Systems Inc., Lyndhurst, Ohio

[21] Appl. No.: 528,150

[22] Filed: May 24, 1990

[51] Int. Cl.[5] .................. C06B 21/00; D01D 0/00
[52] U.S. Cl. .................... 264/3.4; 264/3.1; 264/3.3; 149/35; 149/109.6
[58] Field of Search .............. 264/3.1, 3.3, 3.4; 149/35, 109.6

[56] References Cited

U.S. PATENT DOCUMENTS

| | | | |
|---|---|---|---|
| 3,702,272 | 11/1972 | McDonnell et al. | 149/19 |
| 3,920,575 | 11/1975 | Shiki et al. | 252/188.3 |
| 4,065,529 | 12/1977 | Lavertu et al. | 264/3 E |
| 4,200,615 | 4/1980 | Hamilton et al. | 422/166 |
| 4,243,443 | 1/1981 | Utracki | 149/35 |
| 4,696,705 | 9/1987 | Hamilton | 149/21 |
| 4,817,828 | 4/1989 | Goetz | 222/3 |

OTHER PUBLICATIONS

Mish, Fredrick C., ed., *Webster's Ninth New Collegiate Dictionary*, 1985, pp. 265 and 868.

*Primary Examiner*—Brooks H. Hunt
*Assistant Examiner*—Chrisman D. Carroll
*Attorney, Agent, or Firm*—Tarolli, Sundheim & Covell

[57] ABSTRACT

A process for making a body of gas generating material comprising the steps of preparing a slurry of the ingredients of said gas generating material; extruding said slurry into a plurality of extrudate; forming the extrudate into spherical granules; and pressing a plurality of granules to form a unitary body.

24 Claims, 4 Drawing Sheets

SPHERONIZING PROCESS

BACKGROUND OF THE INVENTION

1. Technical Field

The present invention relates to a method of manufacturing gas generating material, and particularly to a method of making gas generating bodies from gas generating material.

2. Description of the Prior Art

A gas generating body (known as a "grain") is used to generate gas to inflate a vehicle occupant restraint such as an airbag. U.S. Pat. No. 4,696,705, assigned to the assignee of the present application, discloses such a gas generating body. The gas generating body when ignited generates nitrogen gas to inflate an airbag. The gas generating body preferably has a plurality of longitudinally extending passages parallel to the axis of the body.

Upon ignition of the gas generating body, it has a progressive rate of burn. A progressive rate of burn is one in which the burning proceeds, for a substantial part of the burn cycle, at a rate which increases. As the circumferential surfaces of the passages in the body burn, the passages widen, exposing increasingly more surface area to burning. Simultaneously, the outer circumference of the body of gas generating material shrinks, reducing the surface area exposed to burning, but this reduction in surface area is less than the increase in surface area produced by burning in the passages in the grain. At a point in the burn cycle, the burn rate ceases to increase and remains constant until near the end of the burn cycle, at which time the rate of burn decreases to zero. Nonetheless the period of increasing burn rate extends for a substantial part of the burn cycle Typically, a body of gas generating material is manufactured by first producing a gas generating material in the form of a dry powder, flowing the dry powder into a die, and applying a high pressure to the powder so that the powder particles adhere to each other to form the body. U.S. Pat. No. 4,696,705 discloses such a process.

In order to manufacture bodies of gas generating material which have a plurality of passages to provide a progressive rate of burn, it is necessary to have a plurality of closely spaced pins which extend longitudinally in a die cavity. The gas generating material is introduced into the die cavity around the pins. If the gas generating material does not flow readily into the die cavity and around the pins, air pockets can form in the material in the die cavity. When a high pressure is applied to the material in the die cavity, the material may apply a lateral force against a pin. If an air pocket is on the side of the pin opposite the direction of action of the lateral force, the pin may break.

SUMMARY OF THE INVENTION

The present invention resides in a process for making gas generating material which can readily flow. When the material is directed into a die cavity, it completely fills the die cavity and surrounds the aforementioned pins which may be closely spaced in the die cavity. Thus, the aforementioned air pockets are not created, and breakage of the pins during pressing of the material is minimized.

The process of making the gas generating material comprises the steps of (a) preparing a wet mixture of the ingredients of the gas generating material, (b) extruding the wet mixture, and then (c) forming the extrudate into spherical shaped granules. Since the granules are in a spherical shape they readily flow when in a dry state.

Preferably, the wet mixture of ingredients includes an azide and a metal oxide which is reactive with the azide. The wet mixture is preferably prepared with a relatively high moisture content, suitable for grinding. Prior to extruding, the wet mixture is dried to a moisture content effective for extruding. The extrudate is formed into a spherical shape by a spheronizer in which the extrudate is rolled into small diameter spheres.

BRIEF DESCRIPTION OF THE DRAWINGS

Further features of the present invention will become apparent to those skilled in the art to which the present invention relates from reading the following specification with reference to the accompanying drawings, in which.

DESCRIPTION OF PREFERRED EMBODIMENT

The present invention relates to a method of making gas generating material and particularly to a method of making a body (known as a "grain") of gas generating material for inflating a vehicle occupant restraint, such as an airbag. The body of gas generating material preferably has a progressive burn rate. The specific composition of the gas generating material may vary and the specific configuration of the body of gas generating material may also vary.

A body 10 of gas generating material contains an alkali metal azide compound. This compound is represented by the formula $MN_3$ where M is an alkali metal, preferably sodium or potassium, and N is nitrogen. The body 10 also contains an oxidant and may contain other materials such as a binder. A preferred oxidant is a metal oxide which is reactive with the alkali metal azide, more specifically a metal oxide wherein the metal of the oxide is lower in the electromotive series of elements than the alkali metal of the azide. Examples of suitable metal oxides are copper oxide, iron oxide, stannic oxide, titanium dioxide, lead oxide, chromium oxide and zinc oxide. A preferred metal oxide is iron oxide ($Fe_2O_3$). Suitable compositions for the body 10 are disclosed in U.S. Pat. No. 4,817,828.

Preferably the body 10 comprises 47.9% to 67.9% by weight of sodium azide, 0% to 10% by weight of sodium nitrate, 0% to 4% by weight of bentonite, 24.6% to 44.6% by weight of iron oxide, and 0% to 6% by weight of graphite fibers. A preferred composition of the body 10 is 57.9% by weight sodium azide, 34.6% by weight iron oxide, 2.5% by weight bentonite, 3% by weight graphite fibers, and 2% by weight sodium nitrate.

The graphite fibers mechanically reinforce the body and help to minimize damage to the body and the resultant exposure of additional surface area which can accelerate the burn rate. The graphite fibers also provide mechanical reinforcement so that when the body 10 burns, it more readily forms a strong structural sinter. The sinter controls the combustion products of the grain. Other fibers, such as fiberglass and steel wool can be used instead of graphite. The bentonite functions as an extrusion aid. Other extrusion aids can be used. The sodium nitrate provides additional oxygen for combustion of the azide. Other inorganic oxides, such as potassium perchlorate, can be used. The composition can also contain other ingredients conventionally used in gas generating bodies, such as a sintering aid, e.g., aluminum oxide.

Figure 2:
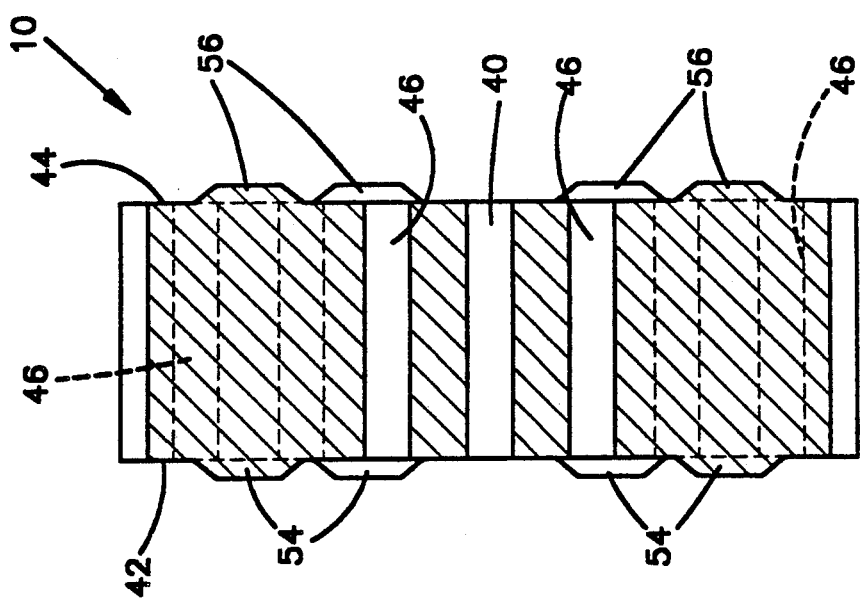
FIG. 2 is a sectional view of the body of FIG. 1 taken along line 2—2 of FIG. 1.

The body 10 has a generally cylindrical shape and has a cylindrical central passage 40 with an axis disposed on the central axis of the grain. The passage 40 extends between axially opposite end faces 42, 44 (FIG. 2) of the body. In addition, the body 10 has a plurality of cylindrical passages 46 which are disposed radially outwardly relative to central passage 40 and which also extend longitudinally through the body between the opposite end faces 42, 44.

Figure 1:
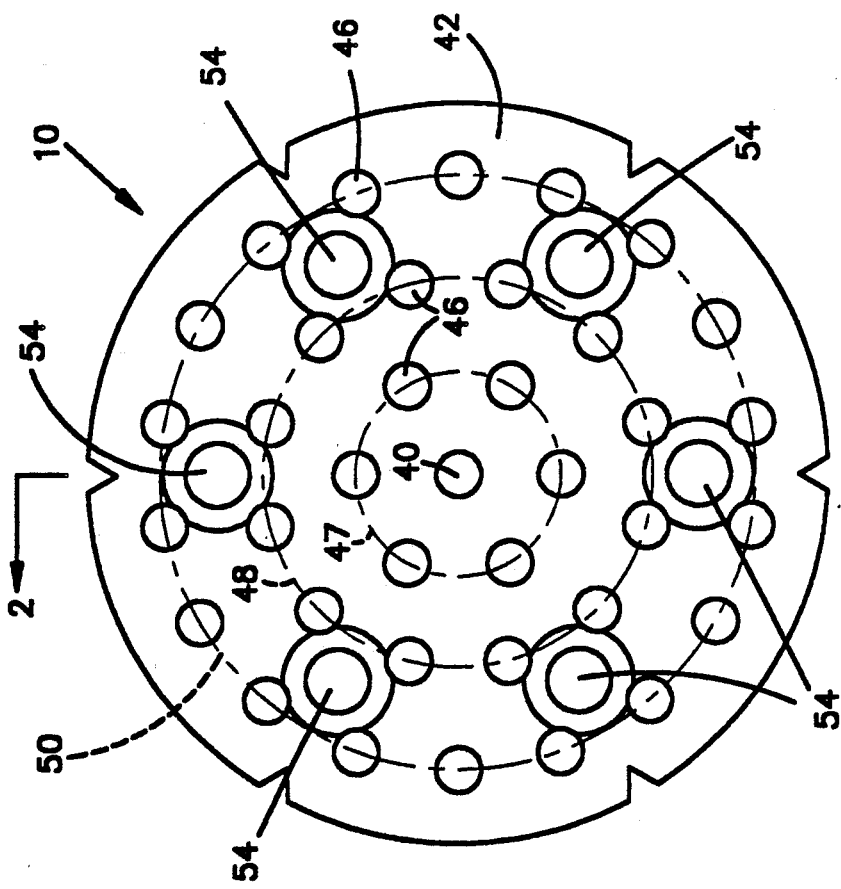
FIG. 1 is a plan view of a gas generating body having a progressive rate of burn.

The axes of the passages 46 are parallel to the axis of passage 40. The passages 46 are evenly spaced on concentric circles 47, 48, 50 which are radially spaced from passage 40, but co-axial with the axis of passage 40. The respective passages 46 on concentric circle 47 are spaced apart equal to the spacing of the passages 46 on concentric circles 48 and 50. As shown in FIG. 1, the axes of the passages 46 on one of the concentric circles 47, 48 and 50 are offset circumferentially, to one side, from the axes of the passages 46 on the other concentric circles. In this respect, a passage 46 on concentric circle 48 is spaced from an offset passage 46 on concentric circle 50 the same distance that it is spaced from an adjacent passage 46 on concentric circle 48. Also, a passage 46 on concentric circle 48 is spaced from an offset passage 46 on concentric circle 47 the same distance that it is spaced from an adjacent passage 46 on concentric circle 48.

A plurality of the bodies 10 are used to generate gas to inflate a vehicle occupant restraint such as an airbag. As shown in U.S. Pat. No. 4,817,828, a plurality of bodies 10 are stacked together and, when ignited, generate gas which is filtered and directed into an airbag. When used to inflate an airbag, the plurality of bodies 10 are stacked so that the passages 46 in one body are aligned with the passages 46 in all of the other bodies. Thus, hot gas generated by burning one body flows through the passages 46 to ignite adjacent bodies, and the surfaces of the passages 46 of all of the bodies are quickly ignited.

The gas which is generated within the passages 46 must be able to get out of the passages and flow radially of the bodies into an airbag to inflate the airbag. To provide for such flow, spaces are provided between the end faces 42, 44 of adjacent bodies 10. The spaces extend radially outward from the central passage 40 of the bodies. The spaces between the ends of adjacent bodies are provided by axially projecting standoff pads 54, 56, FIG. 2, on the end faces 42, 44. As disclosed in prior U.S. Pat. No 4,817,828, the standoff pads of one body are aligned with those of an adjacent body so that the spaces between the bodies are provided by the standoff pads of adjacent bodies. Several standoff pads 54, 56 are positioned in circumferentially spaced apart relationship on each end face 42, 44 so as to maintain the end faces 42, 44 of adjacent bodies in spaced apart parallel planes.

The plurality of passages 46 in a body 10 promote what has been referred to as a progressive rate of burn of a body. A progressive rate of burn is one in which the burning proceeds, for a substantial part of the burn cycle, at a rate which increases. As the circumferential surfaces of the passages 46 burn, the passages 46 widen, exposing increasingly more surface area to burning. Simultaneously, the outer circumference of each body 10 shrinks, reducing the surface area exposed to burning, but this reduction in surface area is less than the increase in surface area produced by burning in the passages 46 in the body. At a point in the burn cycle, the burn rate ceases to increase and remains constant until near the end of the burn cycle, at which time the rate of burn will decrease to zero.

A progressive rate of burn is in contrast to a neutral rate of burn, in which a substantially constant grain surface area is exposed to burning throughout the burn cycle, as disclosed in prior U.S. Pat. No. 4,200,615, and the burn rate, after an initial spurt, is essentially constant for most of the burn cycle. A progressive rate of burn is also different from a regressive rate of burn, in which the burning proceeds, from an initial high burst, at a decreasing rate for most of the burn cycle.

It is desirable for the bodies 10, particularly in a passenger side vehicle occupant restraint, to have a progressive rate of burn. A progressive burn rate allows the airbag to inflate more slowly when it is first emerging from the dashboard, thereby reducing the force of any impact of the bag against a passenger, such as a child. After the bag has emerged from the dashboard, the progressive burn rate allows the bag to fill at an increasing rate.

Figure 3:
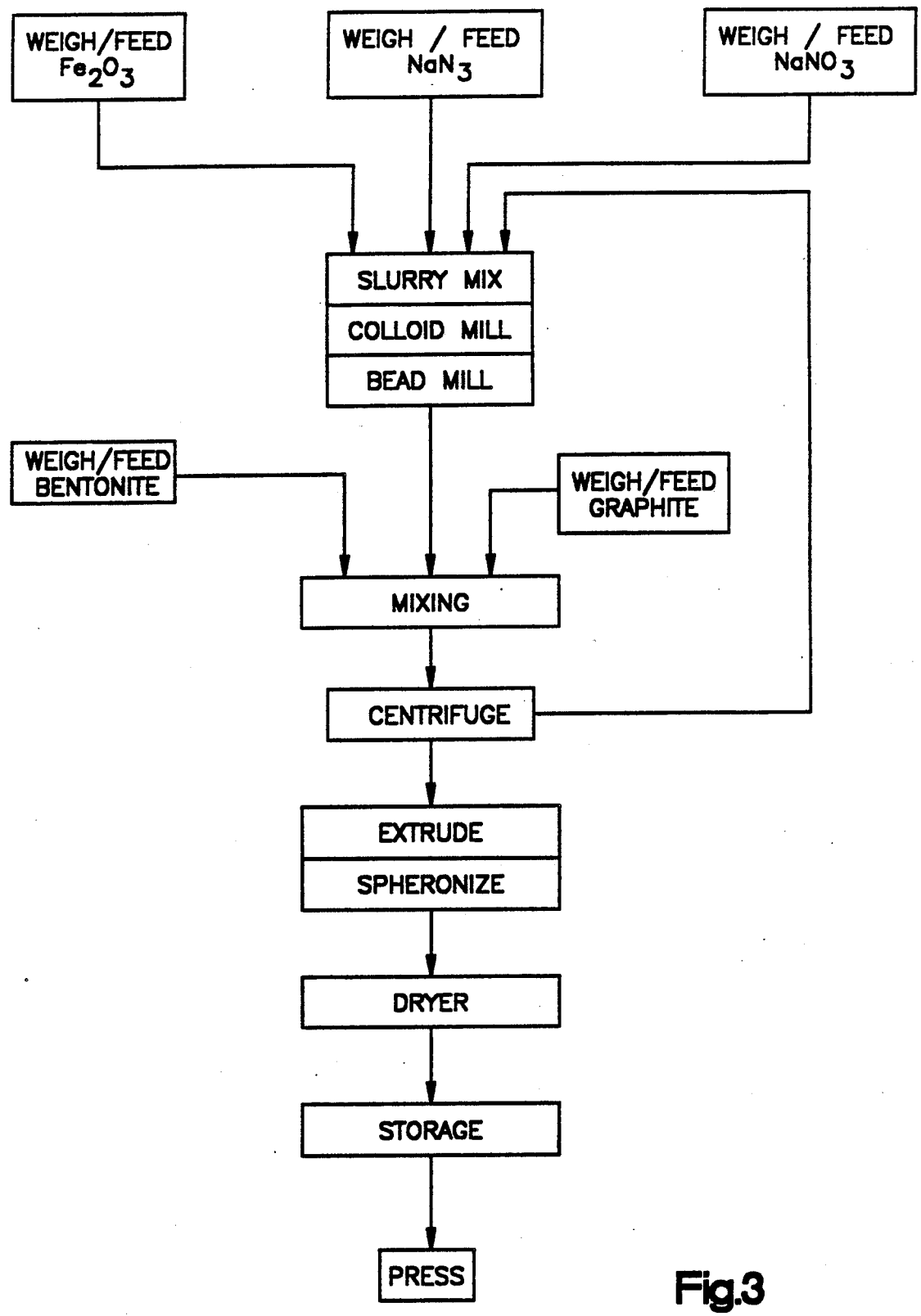
FIG. 3 is a flow diagram illustrating the process steps for manufacturing gas generating bodies in accordance with the present invention.

Referring to FIG. 3, the process of making a body 10, in accordance with the present invention, begins with preparing a wet mixture or slurry of iron oxide, sodium azide, sodium nitrate and water. The wet mixture or slurry of gas generating material is wet milled or comminuted to a fine particle size in a colloid mill and then in a bead mill. The particle size of the solids in the wet mixture exiting from the bead mill is less than 5 microns.

Graphite fibers and bentonite, if used, are then added to the wet mixture of gas generating material and further mixing is carried out. At this point, the wet mixture contains about 50% solids. The wet mixture is pumped to a known centrifuge where it is filtered to provide a moisture content of about 7% to 11% by weight, preferably 9% by weight. The centrifuge processes the wet mixture in discrete batches, each of which is acted upon by the centrifuge for a predetermined time period in the order of ten minutes. The wet mixture of gas generating material, containing about 9% moisture, is then extruded by forcing the gas generating material through small openings. After extruding, the material is formed into small spherical balls in a spheronizer. The spheronized particles are conveyor dried, stored, for instance in a surge vessel, and then pressed into the desired shape. The bodies may be coated and then packaged. The filtrate from the centrifuge is recycled and used in making additional wet mixtures In the recycle step, water, sodium azide, and sodium nitrate are added to the filtrate from the centrifuge.

Details of the process are disclosed in co-pending application Ser. No. 528,444, entitled "Process for Manufacturing a Gas Generating Material", filed by Thomas H. Vos, James M. Kumkoski, Leo S. Knowlden and George W. Goetz, on May 24, 1990, now U.S. Pat. No. 4,994,212, assigned to the assignee of the present application.

Figure 4:
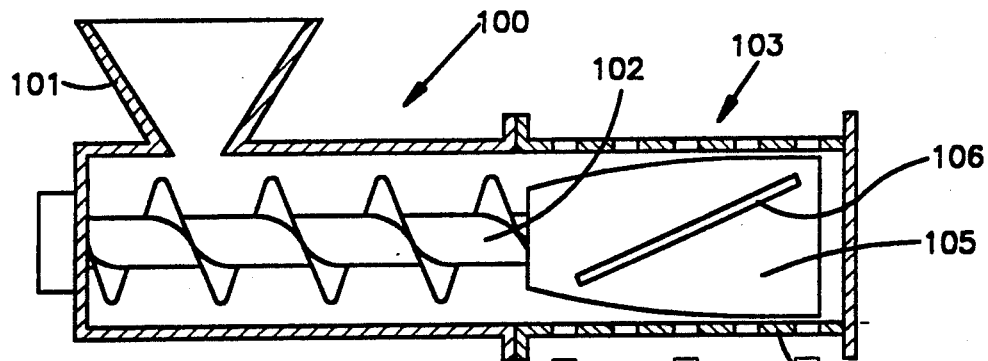
FIG. 4 is a schematic sectional view of an extruder used in the process of FIG. 1.
Figure 5:
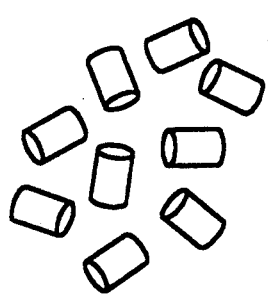
FIG. 5 is a view showing the shape of the extrudate obtained from the extruder of FIG. 4.

FIG. 4 shows the type of extruder 100 that may be employed in the practice of the present invention. The damp mixture from the centrifuge is introduced into a feed hopper 101 of the extruder 100. Twin transport screws 102 convey the damp material from the feed hopper 101 to the extrusion zone 103. The extrusion zone 103 is defined by a radial screen 104 encompassing a pair of parallel rotors 105, only one of which is shown in FIG. 4. The rotors 105 have longitudinally extending helical blades 106 and on rotation expel the material through the radial screen 104. The material, during expelling, is formed into extrudate which drops from the screen as shown schematically in FIG. 4. The extruder screen has an average hole diameter of about 0.5 to about 0.7 millimeters. The extruder produces extrudate (FIG. 5) having a length of about 5 to about 20 millimeters and a diameter of about 0.5 to about 0.7 millimeters.

Figure 8:
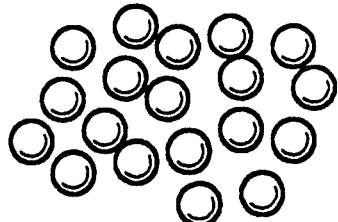
FIG. 8 is a view of particles obtained from the spheronizer of FIG. 6.
Figure 6:
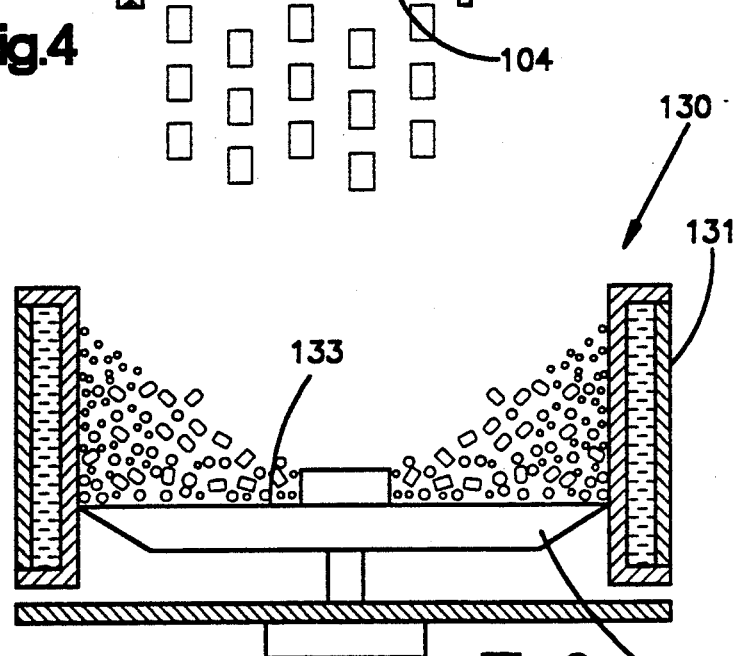
FIG. 6 is a schematic sectional view of a spheronizer used in the process of FIG. 1.
Figure 7:
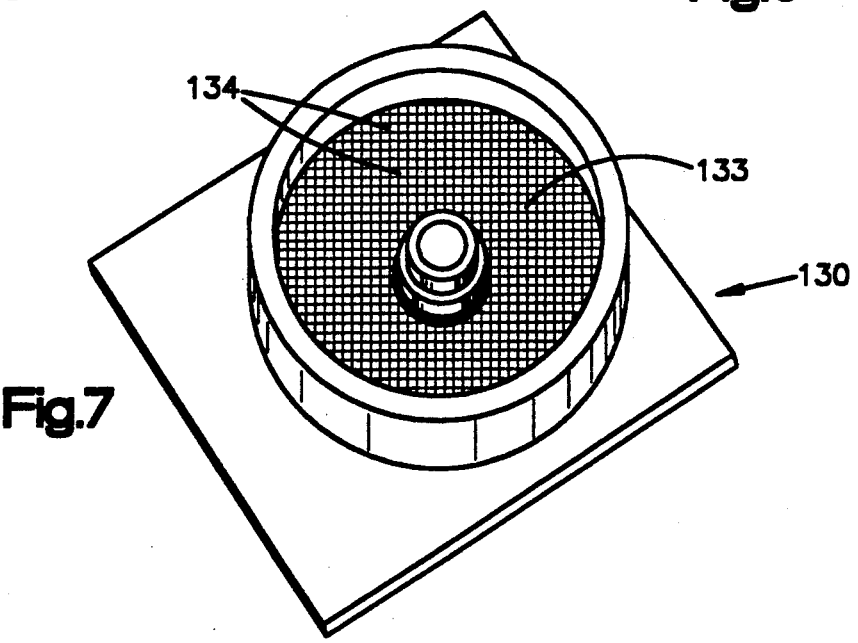
FIG. 7 is an isometric view of the spheronizer of FIG. 6.

The extrudate are then conveyed to a spheronizer 130 (FIG. 6). The spheronizer comprises a cylindrical housing 131 in which a rotatable disk 132 is supported, as shown in FIG. 6. The disk 132 has a waffle pattern on its upper face 133 comprising two sets of grooves 134 (FIG. 7) which intercept each other at right angles. The grooves 134 are nominally two millimeters in depth. The extrudate are introduced onto the disk 132, as shown in FIG. 6. On rotation of the disk 132, the extrudate are broken up and are rolled into small spheres of about 0.5 to about 0.7 millimeters in diameter, having the configuration shown in FIG. 8. As the disk 132 rotates, the material moves radially outwardly of the disk 132 and toward the housing 131. The resulting spheres exit from the disk at a location adjacent the periphery of the disk.

The residence time of the material in the spheronizer is 15 to 20 seconds. Preferably, the housing 131 is heated by flowing a heated fluid through conduits in the housing 131. Heating minimizes sticking of the material to the housing 131 and thus facilitates separation of the material from the housing 131.

The small spheres after being formed are dried in a suitable dryer (FIG. 3). Preferably, the dryer includes a plurality of disks which rotate in a chamber. Heated gas is directed through the chamber. The spheres drop onto a first disk, and as the disk rotates, the spheres are moved radially of the disk to a location where they drop onto the next disc. The spheres again move radially on the next disk as the next disk rotates, and then drop onto another disk. The spheres move from disk to disk until the spheres are dried to a desired moisture content. The time of residence of the spheres in the dryer is such that when they exit the dryer they have a moisture content of about 2 to 3½% by weight. The spheres are then stored.

Figure 9:
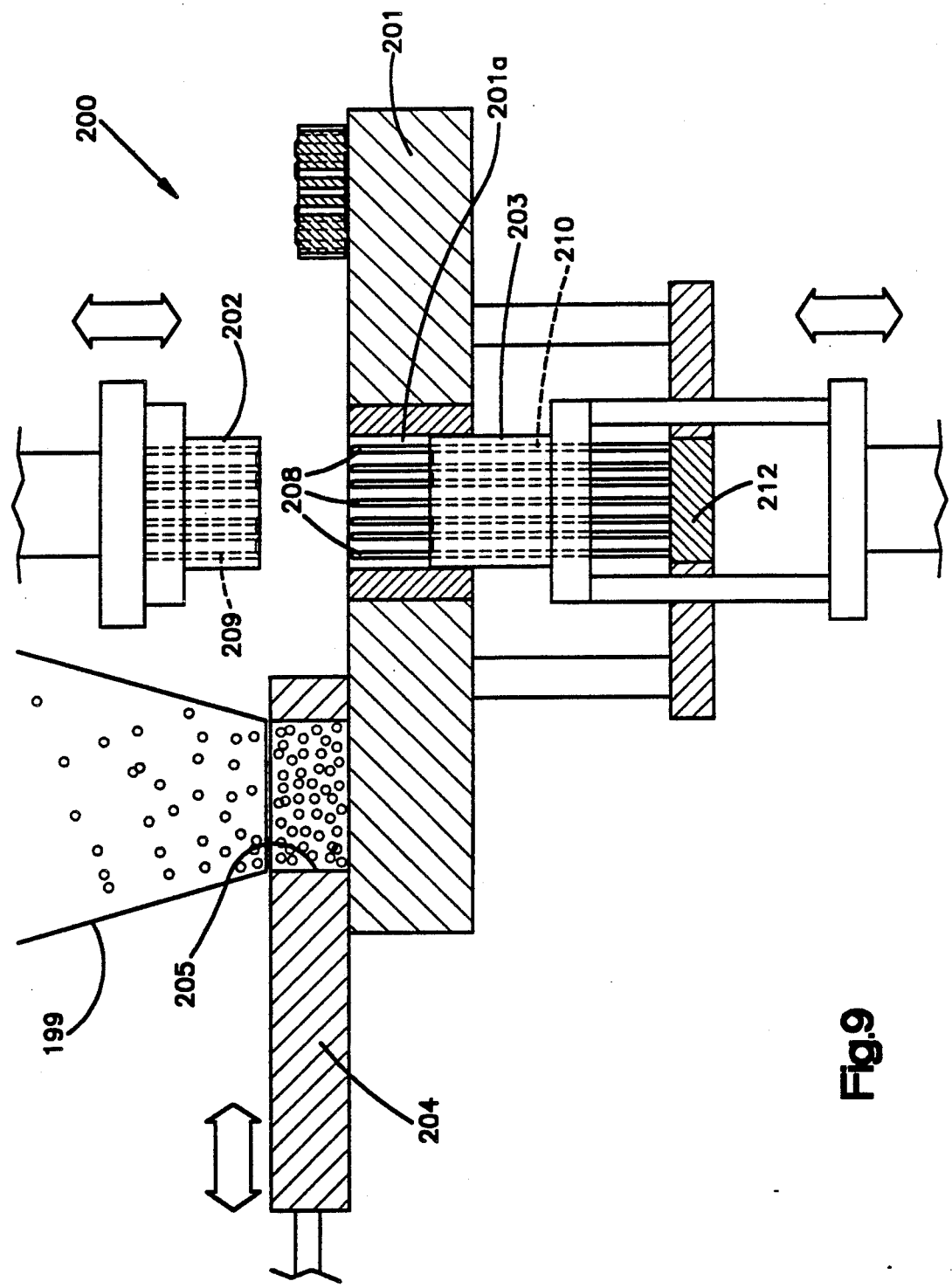
FIG. 9 is a schematic view of a press used in the process of FIG. 1.

When needed to make grains, the dried spheres of gas generating material are placed in the feeder hopper 199 (FIG. 9) of a press 200 which forms the bodies 10. As shown in FIG. 9, the press 200 includes a die 201 defining a die cavity 201a, a movable upper die plate 202, a movable lower die plate 203, and a material feed shoe 204. The material feed shoe 204 has a charge cavity 205 for granular material. The feed shoe 204 reciprocates between a first position shown in full lines in FIG. 9 and a second position in which the charge cavity 205 is aligned with the die cavity. In the first position, the spherical granules flow by gravity out of the feed hopper 199 into the charge cavity 205. The feed shoe is then reciprocated from the full line position in FIG. 9 to the second position in which the charge cavity 205 is aligned over the die cavity 201a. When in this position the spherical granules flow from the charge cavity 205 into the die cavity 201a.

A plurality of stationary pins 208 extend vertically through the die cavity 201a. The pins are spaced approximately 1/10 of an inch or 2.54 millimeters from each other and are in an arrangement corresponding to the arrangement of the passages 40 and 46 in the body 10. The spherical granules, because of their shape readily flow completely around the pins 208 and fill the die cavity 201a completely even though the pins 208 are very closely positioned relative to each other. Since the material readily flows into the die cavity 201a, the formation of air pockets in the material in the die cavity is minimized, and the breakage of the pins 208 is minimized.

After the die cavity 201a is filled, the feed shoe 204 returns to its first position to receive another charge of material from the feed hopper 199. The die plates 202 and 203 move relative to one another and apply pressure to the spherical granules in the die cavity 201a. As shown in FIG. 9, the die plates 202, 203 have openings 209, 210, respectively, shown in dashed lines. The pins 208 are fixed to a support 212 and extend upwardly through the openings 210 in the die plate 203. When the upper die plate 202 moves downwardly, the openings 209 therein receive the ends of the pins 208. Thus, the pins 208 do not interfere with movement of either of the die plates 202, 203.

The pressure which is applied to the material in the die cavity by die plates 202, 203 is in the order of 7 to 12 tons per square inch. This pressure causes the granules to adhere to each other and form the body 10. After the body 10 is formed, the upper die plate 202 is moved upwardly clear of the mold 201 and the lower die plate 202 is moved upwardly to eject the pressed finished body 10. The pressed finished body 10 is then moved by the lead end of the feed shoe 204 to a discharge location on the next movement of the feed shoe over the die cavity 201a.

From the above description of a preferred embodiment of the invention, those skilled in the art will perceive improvements, changes and modifications. Such improvements, changes and modifications within the skill of the art are intended to be covered by the appended claims.

We claim:

1. A process for forming a body of gas generating material comprising the steps of:
   (a) preparing a wet mixture of the ingredients of said gas generating material;
   (b) extruding said wet mixture into a plurality of discrete non-spherical extrudate,
   (c) forming said non-spherical extrudate into spherical granules;
   (d) flowing said spherical granules into a die cavity; and (e) pressing said spherical granules in said die cavity to form a unitary body of gas generating material.

2. The process of claim 1 wherein said ingredients comprise an azide and a metal oxide reactive with said azide.

3. The process of claim 1 wherein said spheres have average diameter of about 0.5 to about 0.7 millimeters.

4. A process for forming a body of gas generating material having a plurality of passages therein; said process comprising the steps of:
 (a) preparing a wet mixture of the ingredients of said gas generating material, said wet mixture comprising an azide and a metal oxide reactive with said azide;
 (b) comminuting said wet mixture;
 (c) removing liquid from said wet mixture to provide a predetermined moisture content;
 (d) forcing the wet mixture having the predetermined moisture content through small openings to form a plurality of generally cylindrically shaped extrudate;
 (e) forming said cylindrically shaped extrudate into particles having a spherical shape, said spherical particles having an average particle diameter of about 0.5 to about 0.7 millimeters;
 (f) drying said spherical particles;
 (g) directing said spherical particles into a die cavity having a plurality of pins therein corresponding to the passages in the body of gas generating material;
 (h) pressing said particles in the die cavity to form the body of gas generating material; and
 (i) removing the body of gas generating material from the die cavity.

5. A process for forming a body of gas generating material as defined in claim 4 wherein said ingredients comprise an alkali metal azide and a metal oxide.

6. A process for forming a body of gas generating material as defined in claim 5 wherein said step of forming said cylindrically shaped extrudate into a spherical shape comprises the steps of rotating said extrudate on a plate in a chamber having a heated wall, the material moving radially outwardly of the plate and exiting from the plate adjacent the heated wall as spherical granules.

7. A process for forming granules of gas generating material having a spherical configuration comprising the steps of:
 (a) preparing a wet mixture of the ingredients of the gas generating material;
 (b) comminuting the wet mixture to reduce the particle size of at least some of said ingredients;
 (c) extruding said wet mixture into a plurality of discrete extrudate non-spherical; and
 (d) forming said non-spherical extrudate into a spherical configuration.

8. The process of claim 7 wherein the ingredients of the gas generating material comprise a metal azide and a metal oxide reactive with said azide.

9. The process of claim 8 wherein at least some of the ingredients of the wet mixture are comminuted to an average particle diameter of less than 5 microns.

10. The process of claim 7 wherein the spherical granules have an average particle diameter of about 0.5 to about 0.7 millimeters.

11. A spherical particle of gas generating material prepared by the method of claim 7.

12. A process for forming a body of gas generating material comprising the steps of:
 (a) preparing a wet mixture of the ingredients of said gas generating material;
 (b) forming said wet mixture of gas generating material into spherical granules;
 (c) flowing said spherical granules into a die cavity which includes a plurality of pins extending therethrough, said step of flowing said granules into the die cavity includes flowing the granules around said pins; and
 (d) pressing said spherical granules in said die cavity to form a unitary body of gas generating material.

13. A process for forming a body of gas generating material comprising the steps of:
 (a) preparing a wet mixture of the ingredients of said gas generating material;
 (b) forming said wet mixture of gas generating material into spherical granules, said step of forming said wet mixture into spherical granules comprising the steps of removing liquid from said wet mixture to provide a mixture of a predetermined moisture content, extruding said mixture of a predetermined moisture content to form extrudate, and forming said extrudate into spheres;
 (c) flowing said spherical granules into a die cavity; and
 (d) pressing said spherical granules in said die cavity to form a unitary body of gas generating material.

14. The process of claim 13 wherein said predetermined moisture content is about 7% to about 11% by weight.

15. The process of claim 14 wherein said predetermined moisture content is about 9%.

16. The process of claim 13 wherein said step of removing liquid from the wet mixture includes placing the wet mixture in a centrifuge for a predetermined time period.

17. A process for forming granules of gas generating material having a spherical configuration comprising the steps of:
 (a) preparing a wet mixture of the ingredients of the gas generating material;
 (b) comminuting the wet mixture to reduce the particle size of at least some of said ingredients;
 (c) extruding the wet mixture into a plurality of discrete extrudate;
 (d) centrifuging the wet mixture to reduce the moisture content of said wet mixture to between about 7% and about 11% by weight subsequent to said step of comminuting the wet mixture and prior to said step of extruding the wet mixture; and
 (e) forming the extrudate into a spherical configuration.

18. A process for forming a body of gas generating material comprising the steps of:
 (a) preparing a wet mixture of the ingredients of said gas generating material;
 (b) forming said wet mixture of gas generating material into a plurality of non-spherical small bodies;
 (c) forming said plurality of non-spherical small bodies into spherical granules;
 (d) flowing said spherical granules into a die cavity; and
 (e) pressing said spherical granules in said die cavity to form a unitary body of gas generating material.

19. The process of claim 18 wherein said step of forming said wet mixture of gas generating material into a plurality of non-spherical small bodies include the step of forcing said wet mixture of gas generating material through small openings to form the plurality of small bodies.

20. The process of claim 18 wherein said step of forming said plurality of non-spherical small bodies into spherical granules includes rolling the plurality of small bodies to form spherical granules.

21. The process of claim 20 wherein said step of forming said plurality of non-spherical small bodies into spherical granules includes placing said plurality of small bodies on a disk with a waffle pattern on at least one side and rotating said disk.

22. A process for forming a body of gas generating material comprising the steps of:
   (a) preparing a wet mixture of the ingredients of said gas generating material;
   (b) removing moisture from said wet mixture of gas generating material to provide a mixture of a predetermined moisture content;
   (c) forming said mixture of predetermined moisture content into spherical granules;
   (d) flowing said spherical granules into a die cavity; and
   (e) pressing said spherical granules in said die cavity to form a unitary body of gas generating material.

23. The process of claim 22 wherein said step of forming said mixture of predetermined moisture content into spherical granules includes forcing said mixture of predetermined moisture content through small openings to form extrudate.

24. The process of claim 22 wherein said step of removing moisture from said wet mixture of gas generating material includes placing said wet mixture in a centrifuge for a predetermined time period.

* * * * *

UNITED STATES PATENT AND TRADEMARK OFFICE
CERTIFICATE OF CORRECTION

PATENT NO. : 5,084,218

DATED : January 28, 1992

INVENTOR(S) : Thomas H. Vos, James M. Kumkoski, Leo S. Knowlden and George W. Goetz It is certified that error appears in the above-identified patent and that said Letters Patent is hereby corrected as shown below:

Column 7, Line 7, Claim 3, insert --an-- before "average".

Column 7, Line 54, Claim 7, insert --non-spherical-- before "extrudate" and delete "non-spherical" after "extrudate".

Signed and Sealed this

Fourth Day of May, 1993

Attest:

MICHAEL K. KIRK

Attesting Officer

Acting Commissioner of Patents and Trademarks